United States Patent
Iwashita et al.

(10) Patent No.: US 7,484,582 B2
(45) Date of Patent: Feb. 3, 2009

(54) SUSPENSION SYSTEM IN FUEL CELL ELECTRIC VEHICLE

(75) Inventors: Kanau Iwashita, Saitama (JP); Shinji Takayanagi, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 533 days.

(21) Appl. No.: 11/201,298

(22) Filed: Aug. 11, 2005

(65) Prior Publication Data
US 2006/0060400 A1    Mar. 23, 2006

(30) Foreign Application Priority Data
Aug. 20, 2004    (JP)    ............... 2004-240698

(51) Int. Cl.
*B62D 61/02* (2006.01)
*B62K 11/00* (2006.01)

(52) U.S. Cl. .............. 180/65.1; 180/220; 180/218

(58) Field of Classification Search .......... 180/65.1, 180/65.3, 65.6, 218–220, 227
See application file for complete search history.

(56) References Cited

U.S. PATENT DOCUMENTS

| | | | | |
|---|---|---|---|---|
| 3,948,543 A | * | 4/1976 | Macdonald et al. | 280/284 |
| 4,076,271 A | * | 2/1978 | Doncque | 280/284 |
| 4,415,057 A | * | 11/1983 | Yamaguchi | 180/227 |
| 4,463,964 A | * | 8/1984 | Takayanagi et al. | 280/284 |
| 4,505,492 A | * | 3/1985 | Tsunoda | 280/284 |
| 4,540,193 A | * | 9/1985 | Noda et al. | 280/284 |
| 4,574,909 A | * | 3/1986 | Ribi | 180/227 |
| 4,596,302 A | * | 6/1986 | Suzuki et al. | 180/227 |
| 4,621,706 A | * | 11/1986 | Boyesen | 180/227 |
| 4,653,604 A | * | 3/1987 | de Cortanze | 180/227 |
| 4,724,920 A | * | 2/1988 | Tsuchida et al. | 180/227 |
| 4,781,264 A | * | 11/1988 | Matsuzaki et al. | 180/219 |
| 4,805,717 A | * | 2/1989 | Trema | 180/219 |
| 4,889,205 A | * | 12/1989 | Yoshimi | 180/227 |
| 5,495,913 A | * | 3/1996 | Salisbury | 180/227 |
| 5,816,357 A | * | 10/1998 | Camlin | 180/227 |
| 5,839,536 A | | 11/1998 | Tanaka | |
| 6,550,796 B2 | * | 4/2003 | Behr | 280/124.125 |
| 6,555,928 B1 | * | 4/2003 | Mizuno et al. | 290/40 C |
| 6,568,496 B1 | * | 5/2003 | Huang | 180/220 |

(Continued)

FOREIGN PATENT DOCUMENTS

EP    0937636 A2    8/1999

(Continued)

*Primary Examiner*—Christopher P Ellis
*Assistant Examiner*—Vaughn T Coolman
(74) *Attorney, Agent, or Firm*—Birch, Stewart, Kolasch & Birch, LLP

(57) ABSTRACT

To provide a suspension system that can efficiently lay out a shock absorber and various accessories in a fuel cell electric vehicle where a fuel cell is mounted in the vicinity of a floor portion of the body. In a suspension system of a fuel cell electric vehicle provided with a fuel cell mounted in the vicinity of a floor portion of the body, a motor is provided for generating a driving force of a vehicle based upon electric power supplied from the fuel cell. A motor unit is supported by a body frame so that the motor unit can be rocked for housing the motor and a shock absorber provided between the motor unit and the body frame. The shock absorber is arranged under the fuel cell.

12 Claims, 7 Drawing Sheets

U.S. PATENT DOCUMENTS

| | | | |
|---|---|---|---|
| 6,581,711 B1 | 6/2003 | Tuluie | |
| 6,691,813 B2* | 2/2004 | Schless | 180/220 |
| 6,722,460 B2* | 4/2004 | Yang et al. | 180/220 |
| 6,722,461 B2* | 4/2004 | Gogo | 180/227 |
| 6,823,958 B2* | 11/2004 | Domenicali et al. | 180/227 |
| 6,889,788 B2* | 5/2005 | Hakamata et al. | 180/219 |
| 7,017,694 B2* | 3/2006 | Shirazawa | 180/65.5 |
| 7,121,366 B2* | 10/2006 | Horii | 180/65.1 |
| 7,131,511 B2* | 11/2006 | Arnold | 180/227 |
| 7,178,620 B2* | 2/2007 | Toyoda | 180/227 |
| 7,234,551 B2* | 6/2007 | Horii | 180/65.1 |
| 7,255,191 B2* | 8/2007 | Baldwin et al. | 180/220 |
| 2002/0005305 A1* | 1/2002 | Hirayama et al. | 180/68.5 |
| 2005/0051370 A1* | 3/2005 | Horii | 180/65.1 |
| 2005/0098373 A1* | 5/2005 | Horii | 180/291 |
| 2006/0019143 A1* | 1/2006 | Muramatsu et al. | 429/34 |

FOREIGN PATENT DOCUMENTS

| | | |
|---|---|---|
| EP | 1251022 A1 | 10/2002 |
| EP | 1270395 A3 | 1/2003 |
| JP | 2002-42843 A | 2/2002 |
| JP | 2005-125840 A | 5/2005 |
| WO | WO-99/29562 A | 6/1999 |

* cited by examiner

SUSPENSION SYSTEM IN FUEL CELL ELECTRIC VEHICLE

BACKGROUND OF THE INVENTION

CROSS REFERENCE TO RELATED APPLICATIONS

The present application claims priority under 35 USC 119 to Japanese Patent Application No. 2004-240698 filed on Aug. 20, 2004 the entire contents of which are hereby incorporated by reference.

1. Field of the Invention

The present invention relates to a suspension system for improving the arrangement of a shock absorber and others in a fuel cell electric vehicle.

2. Description of Background Art

Heretofore, a fuel cell electric vehicle is available for driving a motor based upon an electric power supplied from a fuel cell. The front end of the motor unit is supported by a pivot of a body frame so that the motor unit can be rocked and the rear end of the motor unit is supported by the rear end of the body frame via a shock absorber See, for example, JP-A No. 42843/2002. In such a unit a swing-type fuel cell electric vehicle, the heavy fuel cell is sometimes mounted in the vicinity of a floor portion of the body so as to lower than the center of the gravity.

In the fuel cell electric vehicle, various accessories such as a hydrogen cylinder, a motor driver, a secondary battery, a radiator and a dilutor are required in addition to a fuel cell. Thus, it is desirable to take into consideration the configuration of the shock absorber to be efficiently laid out relative to the position in which the other elements are mounted on a body.

SUMMARY AND OBJECTS OF THE INVENTION

In an embodiment a suspension system is provided for enabling the efficient laying out a shock absorber and various accessories in a fuel cell electric vehicle where a fuel cell is mounted in the vicinity of a floor portion of the body.

As a means for solving the problem, a suspension system in a fuel cell electric vehicle is provided with a fuel cell 51 mounted in the vicinity of a floor portion 3 of the body. A motor 31 is provided for generating a driving force for the vehicle based upon electric power supplied from the fuel cell. A motor unit 20 is supported by a body frame 4 so that the motor unit can be rocked for housing the motor. A shock absorber 33 is provided between the motor unit and the body frame wherein the shock absorber is arranged under the fuel cell.

According to the configuration, even if the fuel cell is arranged in a high position to some extent from the ground to secure a proper road clearance for the fuel cell, a degree of freedom in laying out various accessories that are required for the fuel cell can be enhanced because the space provided under the fuel cell is effectively utilized for providing a space in which the shock absorber is arranged. In addition, the fuel cell can be protected by the shock absorber.

Some embodiments provide a dilutor 56 for diluting gaseous hydrogen not consumed in the fuel cell. The dilutor is arranged below the fuel cell and the shock absorber is arranged between the lower end of the fuel cell and the lower end of the dilutor.

According to one configuration, even if the dilutor is arranged below the fuel cell, a space provided between the lower end of the fuel cell and the lower end of the dilutor is effectively utilized for arranging the shock absorber. In addition, the fuel cell is also protected by the dilutor. In addition, as the shock absorber is located above the lower end of the dilutor, the minimum road clearance of the vehicle is never reduced by the shock absorber.

A shock absorber rod 35 may include one end side of which that is coupled to the motor unit and the other end side of which extends toward the front of the vehicle. A shock absorber arm 36 may be coupled to the other end side of the shock absorber rod with the upside of being supported by the body frame so that the shock absorber arm can be rocked and the downside being coupled to the front end of the shock absorber. The rear end of the shock absorber is coupled to the body frame.

According to the configuration, when the motor unit is vertically rocked for the body frame, the motion is transmitted to the shock absorber arm via the shock absorber rod, the shock absorber arm is longitudinally rocked, and the shock absorber is longitudinally stroked by the motion. More specifically, the vertical motion of the motor unit is converted to a longitudinal motion of the shock absorber and as a result, the vertical motion of the shock absorber is limited.

The front end of the shock absorber is located in front of the fuel cell.

According to the configuration, the length of the shock absorber, that is, stroke length can be extended.

A pipe for exhaust is coupled to the dilutor with a drainage pipe 81 that is arranged on the side of the shock absorber and is arranged so that the pipe for exhaust is overlapped with the shock absorber when the body is viewed from the side.

According to the configuration, as the pipe for exhaust is arranged on the side of the shock absorber, the efficiency of the arrangement of the space can be enhanced. In addition, as the pipe for exhaust is arranged so that it is overlapped with the shock absorber when the body is viewed from the side, the pipe for exhaust can be protected.

According to an embodiment, a space under the fuel cell is effectively utilized and the shock absorber and various accessories can be efficiently laid out. In addition, the performance in protecting the fuel cell can be more enhanced.

According to an embodiment, a performance in laying out the shock absorber and various accessories and a performance in protecting the fuel cell can be enhanced and the minimum road clearance of the vehicle can be secured.

According to an embodiment, the road clearance of the shock absorber can be secured by limiting the vertical motion of the shock absorber.

According to an embodiment, the stroke length of the shock absorber is extended and a range in which the motor unit is rocked can be largely secured.

According to an embodiment, the efficiency of the arrangement of space around the shock absorber is enhanced and a performance in protecting the pipe for the exhaust can be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
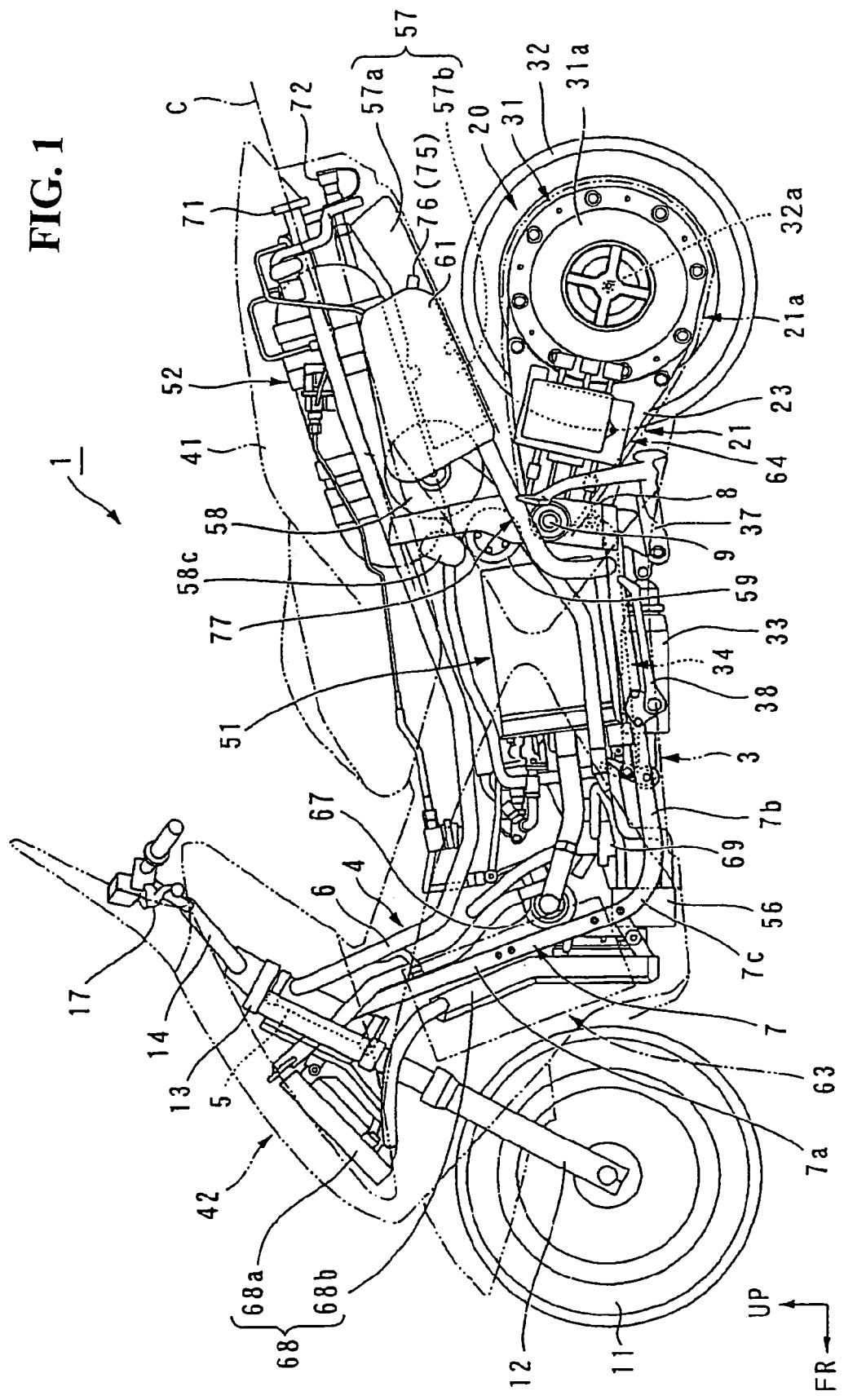
FIG. 1 is a left side view showing a fuel cell electric vehicle (a motorcycle) in an embodiment of the invention.

Referring to the drawings, an embodiment of the invention will be described below. A direction such as forward, backward, rightward and leftward in the following description shall be the same as a direction in a vehicle unless a special description is made. An arrow FR in the drawing indicates the front of the vehicle, an arrow LH indicates the left of the vehicle, and an arrow UP indicates the upside of the vehicle.

Figure 2:
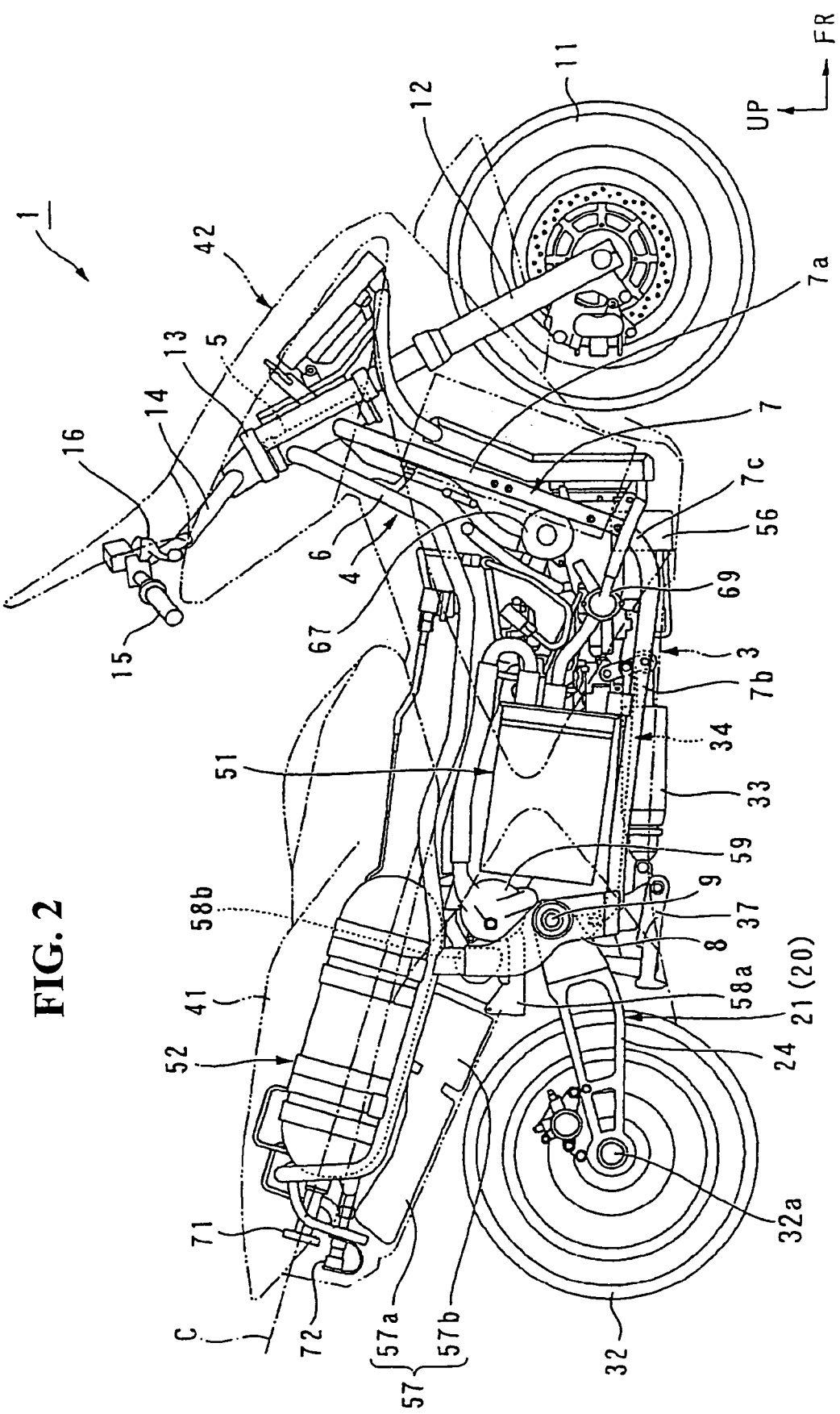
FIG. 2 is a right side view showing the fuel cell electric vehicle.
Figure 3:
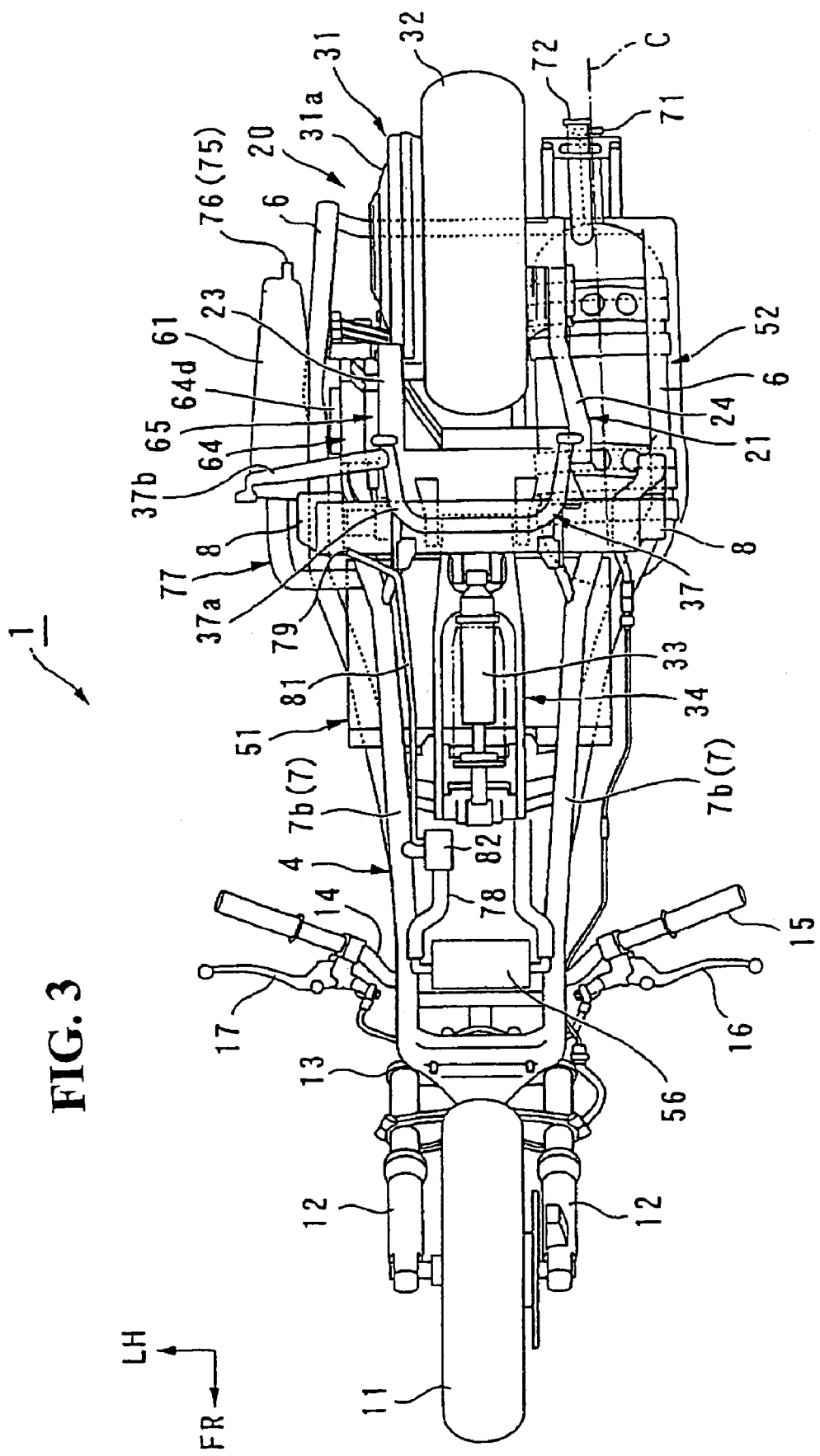
FIG. 3 is a bottom view showing the fuel cell electric vehicle.

A motorcycle 1 shown in FIGS. 1 to 3 is a fuel cell electric vehicle run by driving a motor 31 for driving the vehicle based upon electric power supplied from a fuel cell 51 mounted substantially in the center of the body. The motorcycle 1 is also a scooter-type vehicle provided with a low deck floor portion 3, the rectangular parallelepipedic fuel cell 51 is arranged in the vicinity of the floor portion 3, and the motor 31 is arranged inside a rear wheel 32 which is a driving wheel of the motorcycle 1. The motor 31 is provided with the body of the motor and a deceleration mechanism in a casing 31a, is formed as an integrated unit, and is attached in the wheel from the left side for example in a state in which its output shaft is arranged coaxially with an axle 32a of the rear wheel.

A front wheel 11 of the motorcycle 1 is supported by the lower ends of a pair of right and left front forks 12 and the upside of each front fork 12 is supported by a head pipe 5 at the front end of a body frame 4 via a steering stem 13 so that the front fork can be steered. A handlebar 14 is attached to the upper end of the steering stem 13, a throttle grip 15 is arranged on a right grip of the handlebar 14, and a rear brake lever 16 and a front brake lever 17 are arranged in front of the left and right grips.

A pivot plate 8 extends in a vertical direction of the body and is provided to the rear of the body frame 4 and the front end of a rear swing arm 21 is supported via a pivot 9 by a slightly lower part of an intermediate part of the pivot plate 8 so that the side of the rear end can be vertically rocked. A left arm body 23 of the rear swing arm 21 extends up to the front end of the motor 31 and supports the casing 31a of the motor 31, while a right arm body 24 extends up to a center position of the rear wheel 32 and supports the axle 32a of the rear wheel. A motor unit 20, which is provided as a swing unit of the motorcycle 1, is formed mainly by the above-mentioned rear swing arm 21 and the motor 31.

A shock absorber 33 extends longitudinally and is arranged below the body frame 4 and under the fuel cell 51. The rear end of the shock absorber 33 is coupled to a lower part of the body frame 4 and the front end of the shock absorber 33 is coupled to a lower part of the motor unit 20, the rear swing arm 21, via a link mechanism 34. The link mechanism 34 strokes the shock absorber 33 longitudinally according to the vertical rocking of the motor unit 20 so that shock and vibration input to the motor unit 20 are absorbed by the stroke of the shock absorber 33.

The body frame 4 is provided with an upper tube 6 branched to the right and the left from an upper part of the head pipe 5 that extends diagonally rearwardly and downwardly and extends rearwardly after being bent in a height equivalent to a substantial middle portion in a vertical direction of the body. A down tube 7 is branched to the right and the left from a lower part of the head pipe 5 and extends diagonally rearwardly and downwardly and extends rearwardly after being bent at the lower end of the body. The rear end of each upper tube 6 and the rear end of the down tube 7 are coupled to the upper end and the lower end of the pivot plate 8 located at the back of the fuel cell 51. Hereinafter, a part of the down tube 7 from the head pipe 5 to a bent part 7c at the lower end of the body will be described as a front side 7a and a part from the bent part 7c to the pivot plate 8 will be described as a lower side 7b.

Each upper tube 6 extends further rearwardly from the pivot plate 8 toward the rear end of the body and a rear half of each upper tube 6 is used for a seat frame for supporting a seat 41 for occupants.

The body of the motorcycle 1 is covered with a body cover 42 mainly made of synthetic resin. The body cover 42 also functions as a windshield and a part forms the floor portion 3 together with the body frame 4. A main stand 37 for supporting the body in an upright state is attached to the center of the lower part of the body frame 4 and a side stand 38 for supporting the body in a state in which the body is inclined leftwardly is attached to the left side of the lower part of the body frame 4.

Figure 4:
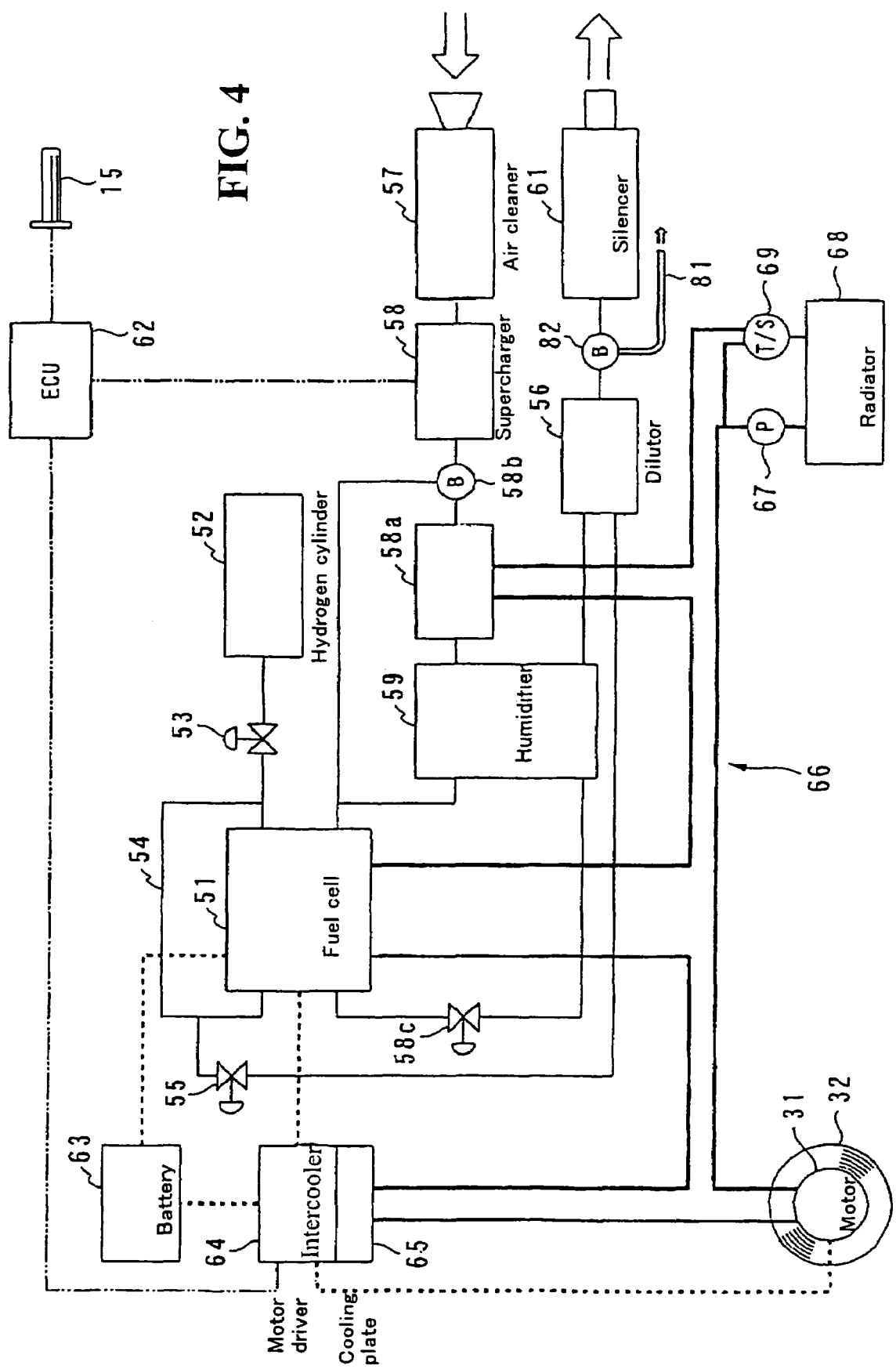
FIG. 4 is a block diagram showing a main part of a fuel cell system in the fuel cell electric vehicle.

Referring to FIG. 4, the outline of a fuel cell system of the motorcycle 1 will be described below.

The fuel cell 51 is a well-known polymer electrolyte fuel cell (PEMFC) acquired by laminating multiple battery modules, battery cells, for generating electric power by electrochemical reaction and for generating water by supplying gaseous hydrogen as the fuel gas to the anode side and supplying air including oxygen to the cathode side as oxidizer gas.

Gaseous hydrogen as a fuel gas is supplied from a hydrogen cylinder 52 to the fuel cell 51 via a cut-off valve 53 under a predetermined pressure. After the gaseous hydrogen is used for power generation, it is led into a hydrogen circulating passage 54. In the hydrogen circulating passage 54, unreacted gaseous hydrogen is repeatedly supplied to the fuel cell 51 together with fresh gaseous hydrogen from the hydrogen cylinder 52. Gaseous hydrogen circulated in the hydrogen circulating passage 54 can be led into a dilutor 56 via a purging valve 55.

In the meantime, air as oxidizer gas is supplied to the fuel cell 51 in a state that is pressurized by a predetermined pressure after it is led into a supercharger 58 via an air cleaner 57 and is led into the dilutor 56 after it is used for power generation. An intercooler 58a is provided for cooling air, oxidizer gas, supplied to the fuel cell 51. A humidifier 59 is provided for supplying moisture to the oxidizer gas. A bypass valve 58b is provided for supplying air without passing the intercooler 58a and the humidifier 59 when the fuel cell 51 is at low temperature. A back pressure valve 58c is provided for adjusting the pressure of oxidizer gas in the fuel cell 51.

When the purging valve 55 provided to the hydrogen circulating passage 54 is opened, gaseous hydrogen after reaction is led into the dilutor 56 and after the gaseous hydrogen is mixed with air emitted from the fuel cell 51 and is diluted in the dilutor 56, it is emitted into the air via a silencer 61. Water generated in the fuel cell 51 is accumulated when it is led into the humidifier 59 together with emitted air and is reutilized for moisture supplied to oxidizer gas. Moisture, for example, water vapor, not accumulated in the humidifier 59 is exhausted together with reacted gas via the dilutor 56 or is discharged via a drainage pipe 81, a pipe for discharge, after the moisture is condensed in the dilutor 56. A control valve 82 for opening or closing its channel at a predetermined time is provided to the drainage pipe 81.

The operation of the fuel cell 51 is controlled by an electronic control unit (ECU) 62. More specifically, a signal is provided that is related to the pressure and the temperature of gaseous hydrogen and oxidizer gas, a signal that is related to vehicle speed and the number of revolutions of the supercharger 58 and a signal that is related to the fuel cell 51 and the temperature of its cooling water are inputted to the ECU 62. The operation of the supercharger 58, the bypass valve 58b, the back pressure valve 58c, the purging valve 55 and the cut-off valve 53 is controlled according to each of these signals.

In addition, an acceleration request signal from the throttle grip 15 is inputted to the ECU 62 and the drive of the motor 31 for driving the rear wheel 32 is controlled according to the signal. The motor 31 is a three-phase motor driven when direct current from the fuel cell 51 or a battery 63 as a secondary battery is supplied after the direct current is converted to a three-phase alternating current in a motor driver 64 as an inverter unit.

For a cooling system in the fuel cell system, a cooling channel 66 for making each channel in a water jacket of the fuel cell 51 and the motor 31, in the intercooler 58a and in a cooling plate (a cooler) 65 adjacent to the motor driver 64 communicate is formed, and a water pump 67 and a radiator 68 are provided to the cooling channel 66.

In such a cooling system, as cooling water is circulated in the cooling channel 66 by the operation of the water pump 67, heat is absorbed from the fuel cell 51, the motor 31, oxidizer gas and the motor driver 64 and the heat is radiated by the radiator 68. A thermostat 69 is provided for circulating cooling water without passing the radiator 68 when the fuel cell 51 is at low temperature.

To explain referring to FIGS. 1 to 3, the hydrogen cylinder 52 is a general high-pressure gas cylinder having a cylindrical appearance. In general the hydrogen cylinder 52 is a compound reservoir made of metal and fiber reinforced plastic, and is arranged on the right side of the rear of the body so that its axis C is longitudinal. More specifically, the axis C of the hydrogen cylinder 52 is inclined slightly downwardly and ahead. The hydrogen cylinder 52 at this time is arranged so that the right side end (the outside end) is located slightly outside the outside end of the upper tube 6 on the right side of the body and the left side end (the inside end) is located slightly outside the outside end of the rear wheel 32.

The front and rear ends of the hydrogen cylinder 52 are formed spherically (in other words, in a tapered state) and the hydrogen cylinder is arranged so that the front end is located in front of the pivot plate 8 and the rear end is located at the rear end of the body. A main tap 71 of the hydrogen cylinder 52 and a hydrogen filling port 72 are arranged at the rear end of the hydrogen cylinder 52.

The upper tube 6 on the left side of the body is inclined rearwardly and slightly upwardly and extends substantially linearly rearwardly, while the upper tube 6 on the right side of the body extends gently downwardly in the vicinity of the pivot plate 8, as compared with the upper tube 6 on the left side of the body. The upper tube 6 is gently directed outside in a direction of the width of the body in the vicinity of the pivot plate 8.

In addition, the upper tube 6 on the right side of the body is provided so that the lower end is substantially overlapped with the lower end of the hydrogen cylinder 52 when the body is viewed from the side, is bent upwardly at the rear end of the body, is bent downwardly after the upper tube extends toward the left side of the body to avoid the main tap 71 of the hydrogen cylinder 52 and the hydrogen filling port 72, and is coupled to the rear end of the upper tube 6 on the left side of the body.

The fuel cell 51 is wide in the direction of the width of the body, is vertically flat, and a supply port and an exhaust port of oxidizer gas and gaseous hydrogen and an inlet and an outlet of cooling water are provided relative to the front wall. The humidifier 59 having a body long in the direction of the width of the body is arranged closely on the upside and at the back of the fuel cell 51. The supercharger 58 is arranged closely at the diagonally upper back of the left side of the humidifier 59 and the left side of an introduction duct 57b extending in the direction of the width of the body is connected to the diagonally lower rear of the supercharger 58. The back pressure valve 58c is arranged closely over the left side of the humidifier 58.

The introduction duct 57b is provided so that the right side is located under the hydrogen cylinder 52 and the front end of an air cleaner case 57a is located similarly under the hydrogen cylinder 52 and is connected to the right side. An intake duct not shown is connected to the rear end of the air cleaner case 57a and the air cleaner 57 is configured mainly by the intake duct, the air cleaner case 57a and the introduction duct 57b.

The bypass valve 58b is arranged closely at the back of the right side of the humidifier 59 and the intercooler 58a is arranged closely at the diagonally lower back of the bypass valve 58b. The bypass valve 58b and the intercooler 58a are arranged so that they are located between the right side of the humidifier 59 and the right side of the introduction duct 57b in a longitudinal direction of the body. The downstream side of the supercharger 58 is connected to the intercooler 58a via a lead-through duct not shown.

The silencer 61 is flat in the direction of the width of the body and is arranged on the left side of the rear of the body so that the silencer is located outside the upper tube 6 on the left side of the body in the direction of the width of the body. The silencer 61 is substantially rectangular when it is viewed from the side of the body and is arranged in a state inclined so that the rear is located higher on the diagonally upper left side of the rear wheel 32. The silencer 61 is provided to a rear half of an exhaust pipe 77 and is inclined so that the rear is located higher. A tail pipe 75 projects rearwardly from the rear end of the silencer 61 (the exhaust pipe 77). An exhaust port 76 of reacted gas is formed at the rear end of the tail pipe 75.

The radiator 68 is divided into a relatively small upper radiator 68a located in front of the head pipe 5 and a relatively large lower radiator 68b located in front of the front side 7a of each down tube 7. The water pump 67 is arranged at the back of the right side of the lower radiator 68b and the thermostat 69 is arranged at the back of the diagonally downside of the water pump 67. The battery 63 is flat in the direction of the width of the body and is arranged inside each body cover 42 located on both sides of the lower radiator 68b.

The dilutor 56 is arranged between the bent parts 7c of each down tube 7 so that the dilutor projects downwardly from the lower end of the lower side 7b. An exhaust short pipe 78 is led out of the dilutor 56, is connected to the front side of the lower side 7b of the down tube 7 on the left side of the body, and the exhaust pipe 77 is led from the rear side of the lower side 7b. More specifically, the down tube 7 on the left side of the body forms a part of an exhaust path of reacted gas. Therefore, gas exhausted from the dilutor 56 is exhausted into the air via the exhaust short pipe 78, the lower side 7b of the down tube 7 and the exhaust pipe 77.

The drainage pipe 81 is branched from an intermediate part of the exhaust short pipe 78 via the control valve 82 and extends rearwardly along the lower side 7b of the down tube 7 on the left side of the body. Such a drainage pipe 81 is arranged on the left side of the shock absorber 33 and is arranged so that the drainage pipe is overlapped with the shock absorber 33 when the body is viewed from the side. See, FIG. 5. The rear of the drainage pipe 81 is bent toward the diagonally rear left side and a scupper 79 which is an opening at the rear end is open toward the diagonally rear left side.

Figure 5:
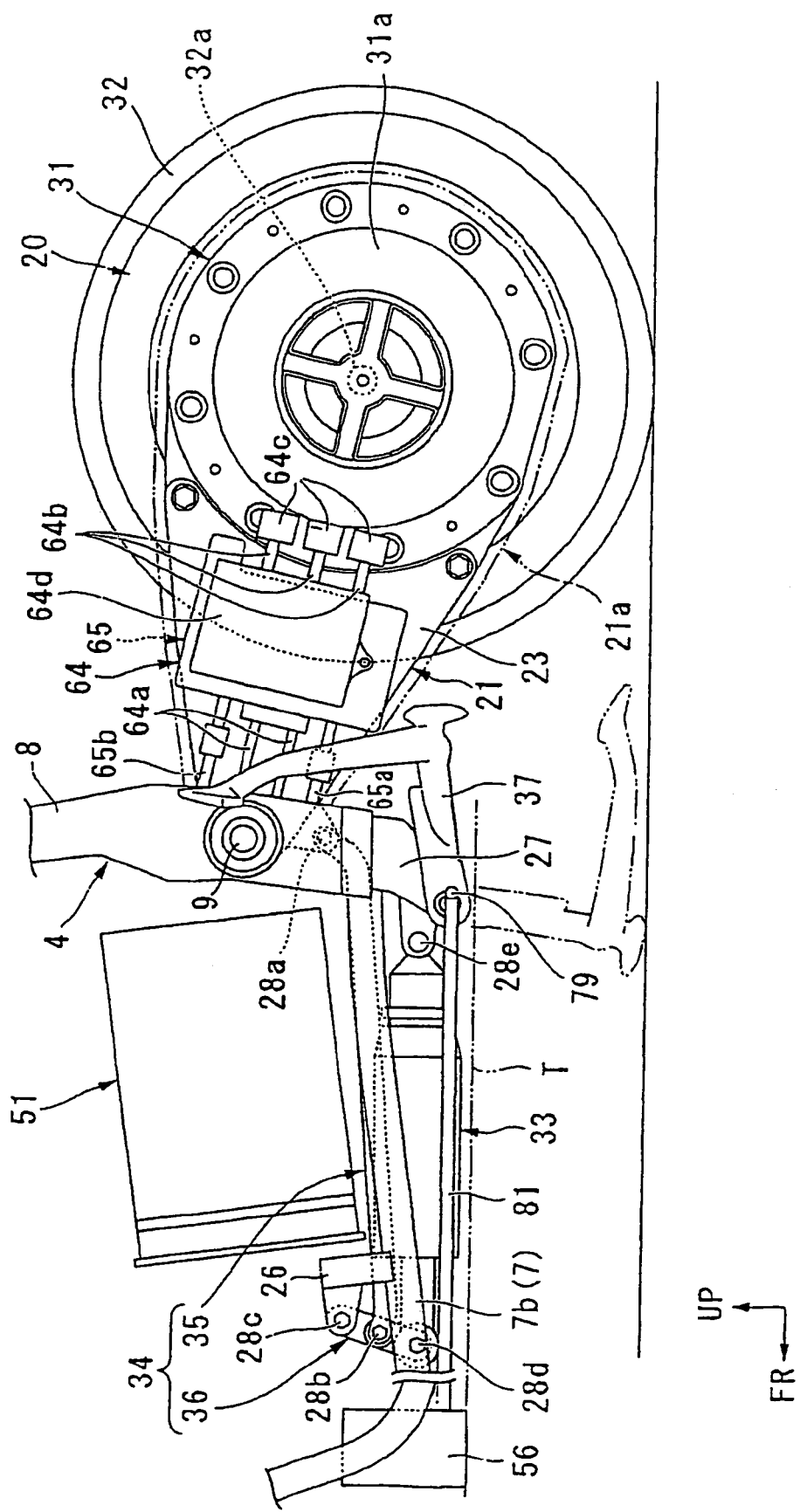
FIG. 5 is an enlarged view showing a main part in FIG. 1.

To explain further with reference to FIG. 5, the motor driver 64 is substantially rectangular when the body is viewed from the side and is attached to the outside in the direction of the width of the body of the left arm body 23 of the rear swing arm 21 via the cooling plate 65. High-voltage wiring 64a for supplying electric power from the fuel cell 51 and the battery 63 is connected to the front end of the motor driver 64. A feed pipe 65a and a drainage pipe 65b which are a part of the cooling channel 66 are connected to a lower part and an upper part of the front end of the cooling plate 65.

Three-phase high-voltage wirings 64b are led out from the rear end of the motor driver 64 and each-phase high-voltage wiring 64b is connected to a feeding terminal at the front end of the motor 31 located immediately to the rear of the motor driver 64. More specifically, the motor driver 64 is arranged close to the motor 31 to an extent that the motor driver is not overlapped with the motor when the body is viewed from the side. A current sensor 64c is provided to each-phase high-voltage wiring 64b for detecting an amount of current fed to the motor 31. A voltage smoothing capacitor 64d is provided as a part of the motor driver 64.

An arm cover 21a as a part of the rear swing arm 21 is mounted on the motor unit 20. The arm cover 21a covers the motor driver 64, the cooling plate 65, the voltage smoothing capacitor 64d, each high-voltage wiring 64a, 64b, the feed pipe 56a, the drainage pipe 65b and the current sensor 64c together with rear swing arm 21 and the motor 31 for suitably protecting these elements. A fresh-air inlet and a fresh-air outlet, not shown, are provided to the arm cover 21a so that outside air can be circulated inside the arm cover 21a.

Figure 6:
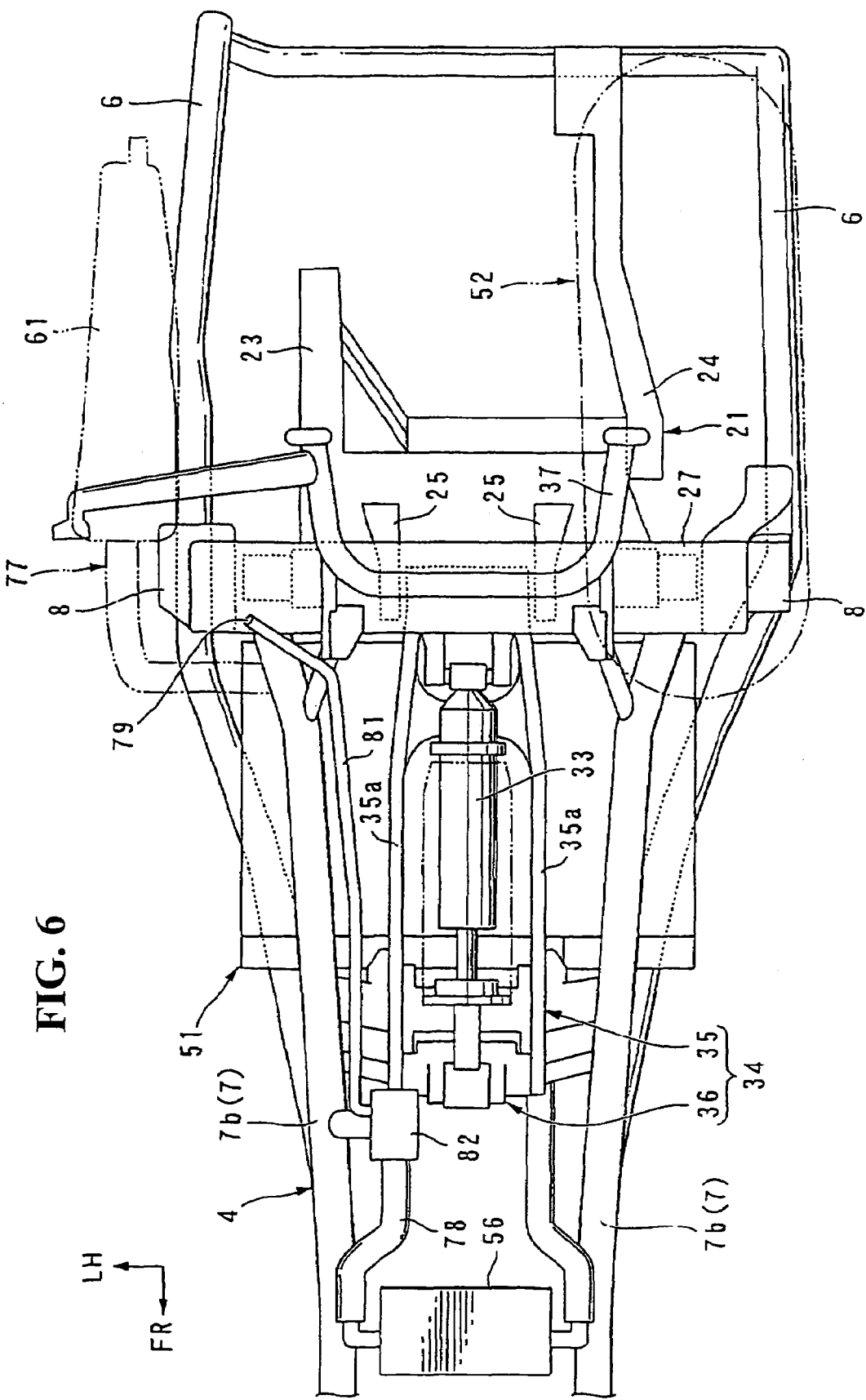
FIG. 6 is an enlarged view showing a main part in FIG. 3.

As shown in FIGS. 5 and 6, the link mechanism 34 is provided with a shock absorber rod 35 extending in the longitudinal direction of the body and a shock absorber arm 36 which is provided to the front end side of the shock absorber rod 35 and which is relatively short. The shock absorber rod 35 is acquired by integrating a pair of rod bodies 35a arranged on both sides of the shock absorber 33 located substantially in the center in the direction of the width of the body using a cross member 35b in each rear portion. The rear end of such a shock absorber rod 35 is coupled to a lower mount 25 provided in the vicinity of the pivot below the rear swing arm 21 via a first coupling shaft 28a.

The front end of the shock absorber rod 35 is coupled to an intermediate part of the shock absorber arm 36 in front of the fuel cell 51 via a second coupling shaft 28b and the upper end of the shock absorber arm 36 is coupled to a mount of a front cross member 26 similarly laid between each down tube 7 in front of the fuel cell 51 via a third coupling shaft 28c. The lower end of the shock absorber arm 36 is coupled to the front end of the shock absorber 33 located in front of the fuel cell 51 via a fourth coupling shaft 28d, and the rear end of the shock absorber 33 is coupled to a mount of a rear cross member 27 laid between the lower ends of each pivot plate 8 via a fifth coupling shaft 28e. Each coupling shaft 28a to 28e is parallel with the pivot 9.

Figure 7:
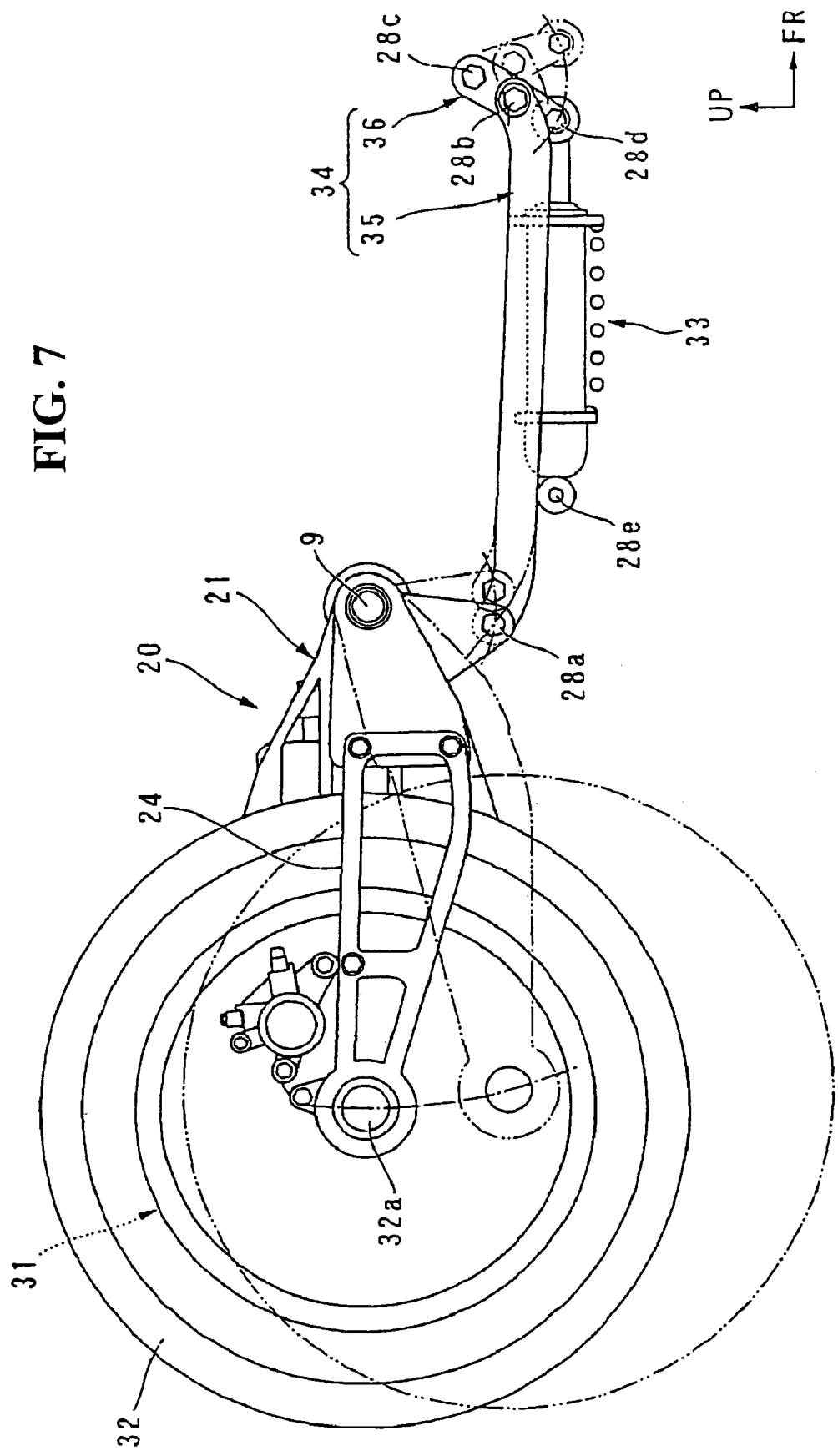
FIG. 7 is a right side view showing a motion of the circumference of a rear swing arm.

In such a configuration, as shown in FIG. 7, when the motor unit 30 is rocked for the body frame 4 with the pivot 9 in the center so that the rear wheel 32 and the motor 31 are vertically moved, the motion is transmitted to the shock absorber arm 36 supported on the side of the body frame 4 so that the shock absorber arm can be rocked via the shock absorber rod 35, the shock absorber arm 36 is rocked with the third coupling shaft 28c in the center so that the lower end side is longitudinally moved, and the front end of the shock absorber 33 coupled to the lower end of the shock absorber arm 36 is longitudinally moved.

As the rear end of the shock absorber 33 is supported by the body frame 4, the shock absorber 33 is longitudinally stroked as a result in case the shock absorber arm 36 is longitudinally rocked. The shock absorber 33 is the existing one acquired by combining a spring and a damper, shock and vibration from a road are converted to the extension/contraction of the spring by stroking the front and rear ends so that they are made close or are separated, and are damped and absorbed by the damper.

As shown in FIG. 5, in the motorcycle 1, the fuel cell 51 which is relatively heavy is mounted in the vicinity of the floor portion 3 in a lower part of the body so as to lower the center of the gravity, while the fuel cell 51 is arranged so that the lower end is slightly higher than the lower side 7b of the down tube 7 so as to secure the road clearance of the fuel cell 51. The shock absorber 33 and the link mechanism 34 are arranged in a space under the fuel cell 51 made by such an arrangement.

The shock absorber 33 is arranged so that it projects downwardly from the lower side 7b of the down tube 7. However, the lower end is set so that it is slightly higher than the lower end of the dilutor 56 in front of the shock absorber 33 and the lower end of the main stand 37 at the back of the shock absorber 33. The lower ends of the dilutor 56 and the main stand 37 are located at the minimum road clearance (shown by a line T in the drawing) of the motorcycle 1 between the front and rear wheels. Therefore, the shock absorber 33 is arranged in the space under the fuel cell 51 without reducing the minimum road clearance.

As described above, the suspension system of the fuel cell electric vehicle, the motorcycle 1, in the embodiment is provided with the fuel cell 51 mounted in the vicinity of the floor portion 3 of the body. The motor 31 is provided for generating a driving force for the vehicle based upon electric power supplied from the fuel cell 51. The motor unit 20 is supported by the body frame 4 so that the motor unit can be rocked for housing the motor 31. The shock absorber 33 is provided between the motor unit 20 and the body frame 4, and the shock absorber 33 is arranged under the fuel cell 51.

According to the configuration, even if the fuel cell 51 is arranged in a position high from the ground to some extent to secure the road clearance of the fuel cell 51, various accessories such as the hydrogen cylinder 52 and others required for the fuel cell 51 are arranged above the motor unit 20 by effectively utilizing the space made under the fuel cell 51 as an arrangement space for the shock absorber 33. Thus, a degree of freedom in laying out these elements can be enhanced. Therefore, the shock absorber 33 and various accessories for the fuel cell 51 can be efficiently laid out.

In addition, as a lower part of the fuel cell 51 can be protected by the shock absorber 33, a performance in protecting the fuel cell 51 can be more enhanced.

Further, the suspension system is provided with the dilutor 56 for diluting gaseous hydrogen not consumed in the fuel cell 51, the lower end of the dilutor 56 is located below the lower end of the fuel cell 51, and the shock absorber 33 is arranged between the lower end of the fuel cell 51 and the lower end of the dilutor 56.

According to this configuration, even if the dilutor 56 is located below the fuel cell 51, the space provided between the lower end of the fuel cell 51 and the lower end of the dilutor 56 is effectively utilized for an arrangement space of the shock absorber 33. The fuel cell 51 is also protected by the dilutor 56. In addition, as the shock absorber 33 is located higher than the lower ends of the dilutor 56 and the main stand 37, the minimum road clearance of the motorcycle 1 is never reduced by the shock absorber 33.

More specifically, the performance in laying out the shock absorber 33 and various accessories and the performance in protecting the fuel cell 51 can be enhanced and the minimum road clearance of the motorcycle 1 can be secured.

Further, the suspension system is provided with the shock absorber rod 35 one end side of which is coupled to the motor unit 20 and the other end side of which extends toward the front of the body and the shock absorber arm 36 which is coupled to the other end side of the shock absorber rod 35 with the upside of which being supported by the body frame 4 so that the shock absorber arm can be rocked and the downside of which is coupled to the front end of the shock absorber 33. The rear end of the shock absorber 33 is coupled to the body frame 4.

According to this configuration, when the motor unit 20 is vertically rocked for the body frame 4, the motion is transmitted to the shock absorber arm 36 via the shock absorber rod 35, the shock absorber arm 36 is longitudinally rocked, and the shock absorber 33 is longitudinally stroked by the motion. More specifically, the vertical motion of the motor unit 20 is converted to the longitudinal motion of the shock absorber 33 and as the vertical motion of the shock absorber 33 is limited as a result, the road clearance of the shock absorber 33 can be secured.

Furthermore, in the suspension system, as the front end of the shock absorber 33 is located in front of the fuel cell 51, the length of the shock absorber 33, that is, the stroke length can be extended and a range in which the motor unit 20 is rocked can be largely secured.

In addition, the suspension system is provided with the drainage pipe 81 coupled to the dilutor 56, the drainage pipe 81 is arranged on the side of the shock absorber 33, and is arranged so that the drainage pipe is overlapped with the shock absorber 33 when the body is viewed from the side.

According to this configuration, as the drainage pipe 81 is arranged on the side of the shock absorber 33, the efficiency of the arrangement space around the shock absorber 33 can be enhanced. In addition, as the drainage pipe 81 is arranged so that it is overlapped with the shock absorber 33 when the body is viewed from the side, a performance in protecting the drainage pipe 81 can be enhanced.

The configuration of the link mechanism 34 and the layout of the dilutor 56 in the above-mentioned embodiment are one example of the invention, needless to say, the invention is not limited to application to a motorcycle, and it need scarcely be said that various modifications are possible in a scope that does not deviate from the object of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A suspension system in a fuel cell electric vehicle provided with a fuel cell mounted in the vicinity of a floor portion of a body, a motor for generating a driving force for the vehicle based upon electric power supplied from the fuel cell, a motor unit supported by a body frame so that the motor unit can be rocked for housing the motor and a shock absorber provided between the motor unit and the body frame, wherein:
   the shock absorber is arranged under the fuel cell, and further comprising:
   a dilutor for diluting gaseous hydrogen not consumed in the fuel cell, wherein:
   the dilutor is arranged below the fuel cell; and
   the shock absorber is arranged between a lower end of the fuel cell and a lower end of the dilutor.

2. The suspension system in a fuel cell electric vehicle according to claim 1, comprising:
   a shock absorber rod, one end side of which is coupled to the motor unit, and another end side of which extends toward a front of the vehicle; and
   a shock absorber arm which is coupled to the another end side of the shock absorber rod, an upside of which is supported by the body frame so that the shock absorber arm can be rocked, and a downside of which is coupled to a front end of the shock absorber, wherein:
   a rear end of the shock absorber is coupled to the body frame.

3. The suspension system in a fuel cell electric vehicle according to claim 2, wherein a front end of the shock absorber is located in front of the fuel cell.

4. The suspension system in a fuel cell electric vehicle according to claim 2, comprising:
   a pipe for exhaust coupled to the dilutor, wherein:
   the pipe for exhaust is arranged on a side of the shock absorber; and
   the pipe for exhaust is arranged so that it is overlapped with the shock absorber when the body frame is viewed from the side.

5. The suspension system in a fuel cell electric vehicle according to claim 1, wherein a front end of the shock absorber is located in front of the fuel cell.

6. The suspension system in a fuel cell electric vehicle according to claim 1, comprising:
   a pipe for exhaust coupled to the dilutor, wherein:
   the pipe for exhaust is arranged on a side of the shock absorber; and
   the pipe for exhaust is arranged so that it is overlapped with the shock absorber when the body frame is viewed from the side.

7. A suspension system in a fuel cell electric vehicle comprising:
   a fuel cell mounted adjacent to a floor portion of a vehicle;
   a motor unit supported by a body frame wherein the motor unit can be pivoted relative to the body frame; and
   a shock absorber provided between the motor unit and the body frame, wherein the shock absorber is arranged under the fuel cell, and further comprising:
a shock absorber rod, one end side of which is coupled to the motor unit, and another end side of which extends toward a front of the vehicle; and
a shock absorber arm which is coupled to another end side of the shock absorber rod, an upside of which is supported by the body frame so that the shock absorber arm can be rocked, and a downside of which is coupled to a front end of the shock absorber, wherein:
the rear end of the shock absorber is coupled to the body frame.

8. The suspension system in a fuel cell electric vehicle according to claim 7, comprising:
a dilutor for diluting gaseous hydrogen not consumed in the fuel cell, wherein:
the dilutor is arranged below the fuel cell; and
the shock absorber is arranged between a lower end of the fuel cell and a lower end of the dilutor.

9. The suspension system in a fuel cell electric vehicle according to claim 8, wherein a front end of the shock absorber is located in front of the fuel cell.

10. The suspension system in a fuel cell electric vehicle according to claim 8, comprising:
a pipe for exhaust coupled to the dilutor, wherein:
the pipe for exhaust is arranged on a side of the shock absorber; and
the pipe for exhaust is arranged so that it is overlapped with the shock absorber when the body frame is viewed from the side.

11. The suspension system in a fuel cell electric vehicle according to claim 7, wherein a front end of the shock absorber is located in front of the fuel cell.

12. The suspension system in a fuel cell electric vehicle according to claim 7, comprising:
a pipe for exhaust coupled to a dilutor, wherein:
the pipe for exhaust is arranged on the side of the shock absorber; and
the pipe for exhaust is arranged so that it is overlapped with the shock absorber when the body frame is viewed from the side.

* * * * *